United States Patent [19]
Wagner

[11] 4,041,833
[45] Aug. 16, 1977

[54] CAP ASSEMBLY FOR A NUT AND BOLT

[76] Inventor: Adolph A. Wagner, 3454 N. Shepard Ave., Milwaukee, Wis. 53211

[21] Appl. No.: 714,031

[22] Filed: Aug. 13, 1976

[51] Int. Cl.$^2$ ............................................. F16B 37/14
[52] U.S. Cl. ........................................... 85/35; 85/56; 151/15
[58] Field of Search .............. 85/53, 54, 55, 56, 32 W, 85/35; 151/15, 16

[56] References Cited

U.S. PATENT DOCUMENTS

| 2,967 | 6/1868 | Seymour | 85/56 |
| 2,095,289 | 10/1937 | Rosenberg | 85/55 |
| 2,234,097 | 3/1941 | Tinnerman | 85/35 |
| 2,401,202 | 5/1946 | Tinnerman | 85/35 |
| 2,819,642 | 1/1958 | Refrigeri | 85/53 |
| 3,881,391 | 5/1975 | Dereszynski | 85/56 |
| 4,008,642 | 2/1977 | Becker | 85/35 |

FOREIGN PATENT DOCUMENTS

| 525,053 | 12/1953 | Belgium | 85/55 |
| 1,566,194 | 3/1969 | France | 85/56 |
| 1,261,528 | 4/1961 | France | 85/35 |
| 1,434,815 | 5/1976 | United Kingdom | 85/56 |
| 18,154 | 9/1905 | United Kingdom | 85/55 |

Primary Examiner—Marion Parsons, Jr.
Attorney, Agent, or Firm—Michael, Best & Friedrich

[57] ABSTRACT

A cap assembly for a bolt having a head and a threaded shank with a nut threaded on the shank including a metal retainer member of substantially U-shape having a base portion and a pair of legs extending therefrom. Each of said legs has a pair of relatively sharp vertical edges thereon and a threaded opening in the base portion for threaded engagement with the bolt. A metal cap member having a top wall portion and a cylindrical wall portion is fitted over the legs of the U-shaped member. The cap and retainer are dimensioned so that when the cap member is assembled on the retainer, the legs of the retainer will be compressed inwardly slightly so that the inherent resiliency of the legs will serve to create a tight frictional engagement between the legs and the cap.

9 Claims, 3 Drawing Figures

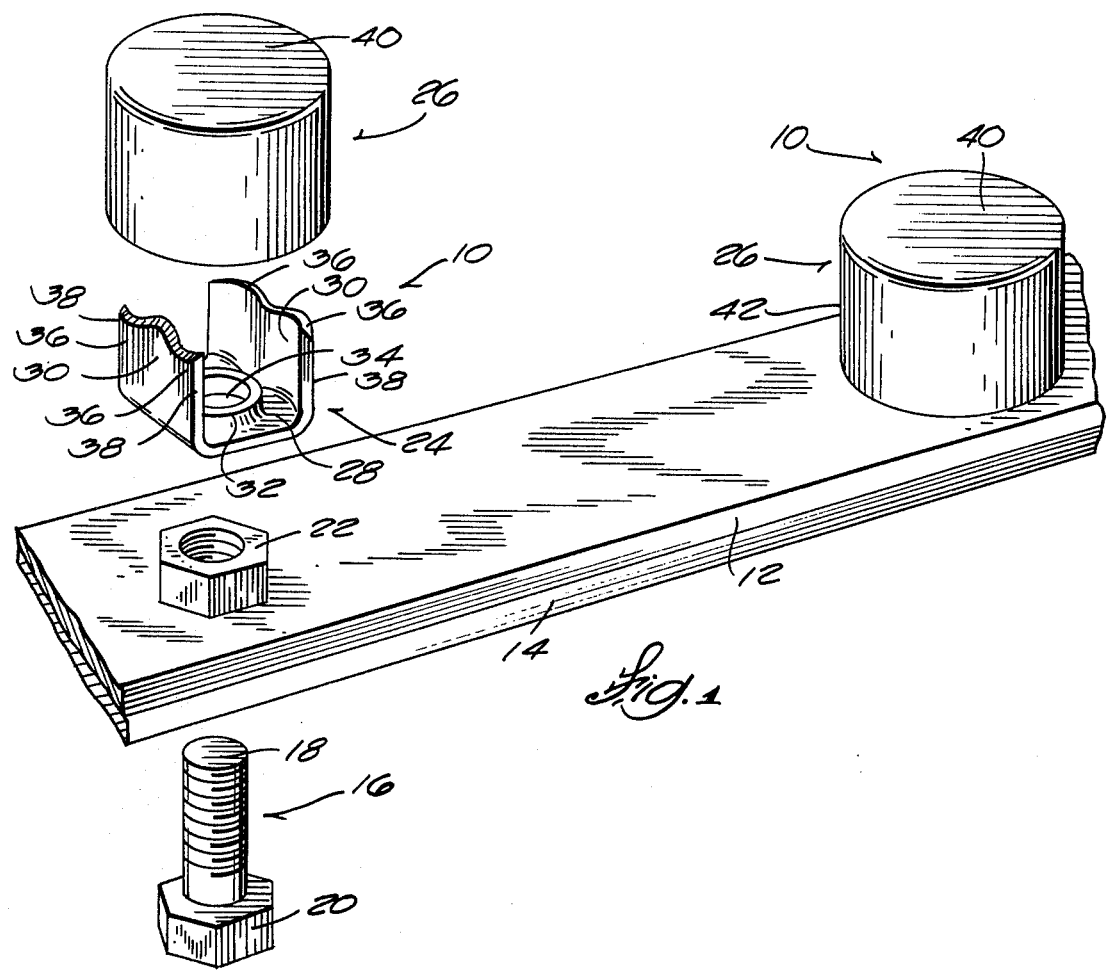
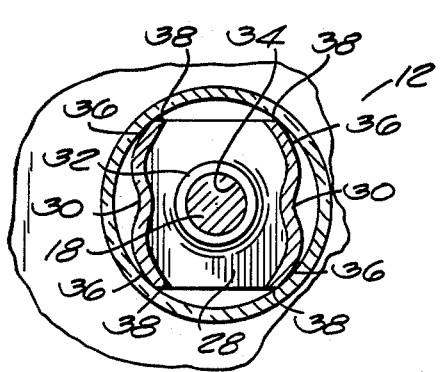
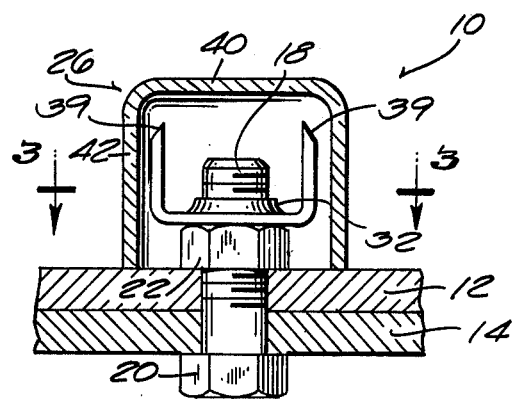

CAP ASSEMBLY FOR A NUT AND BOLT

BACKGROUND OF THE INVENTION

I. Field of the Invention

This invention relates to a bolt cap assembly for covering and enclosing the exposed end of a nut and bolt assembly normally used in an external structure.

II. Description of the Prior Art

The most pertinent prior art known to applicant are U.S. Pat. Nos. 1,805,937, 1,936,624 and 1,994,978. The bolt cap assembly of the present invention is of a relatively simple design as compared to that of the prior art and is also more readily removed and reinstalled than that of the prior art referred to above.

SUMMARY OF THE INVENTION

A cap assembly for a bolt having a head and a threaded shank with a nut threaded on the threaded shank including a retainer member of substantially U-shape having a base portion and a pair of legs extending therefrom. Each of said legs has a pair of relatively sharp vertical edges thereon. Said base portion has a threaded opening therein to facilitate threaded engagement between the retainer and the bolt. A cap member having a top and an integral wall is provided for assembly with the retainer member to cover the exposed end of the bolt and the nut. The wall portion is dimensioned so that when the cap member is fitted over the legs of the retainer member, the sharp edges of the legs will be in tight frictional engagement with the inside surface of the cap.

DESCRIPTION OF THE DRAWINGS

FIG. 1 is a perspective view of the bolt cap assembly made in accordance with the present invention with the parts in unassembled position;

FIG. 2 is a vertical sectional view through the assembly with the parts in assembled position; and FIG. 3 is a sectional view taken along line 3—3 of FIG. 2.

DESCRIPTION OF THE PREFERRED EMBODIMENT

Referring now to the drawings in detail, the bolt cap assembly of the present invention is designated generally by reference numeral 10.

In a typical installation such as that shown in FIG. 1, two structural steel members 12 and 14 are fastened together by one or more bolts 16, each of which is comprised of a threaded shank 18 and a head 20. A nut 22 is threaded on shank 18 to complete the assembly of structural members 12 and 14.

The bolt cap assembly 10 is comprised of two basic parts, namely, a retainer member 24 and a cap member 26. Retainer member 24 is of a substantially U-shape having a base portion 28 and a pair of upstanding legs 30, 30. Base portion 28 has an upset portion 32 through which a threaded opening 34 is made. The legs 30, 30 of retainer 24 are provided with rounded outer surfaces 36 which terminate at sharp edges 38 as best shown in FIGS. 1 and 3. The top edges of legs 30, 30 are chamfered as shown by reference numeral 39.

Cap member 26 is comprised of a substantially flat top portion 40 and a cylindrical wall portion 42 integral therewith.

To assemble the parts described above the nut 22 and bolt 16 are first assembled on members 12 and 14 with the nut tightened onto the bolt as shown in FIG. 2. Next the retainer member is threaded tightly onto the shank 18 of the bolt on top of nut 22 with legs 30, 30 of the retainer member 24 extending upwardly from the nut also as shown in FIG. 2.

The final step is to install cap member 26 on retainer member 24 to complete the assembly. It should be noted at this point that the inside diameter of wall 42 of cap 26 is dimensioned to produce a tight fit between the inside of cap wall 42 and the sharp edges 38 of the retainer member 24. It is also noted that the rounded outer surfaces 36 of legs 30, 30 conform generally to the inside curvature of cap wall 42.

While the retainer 24 in cap member 26 can be made from a variety of materials, in the preferred embodiment the retainer member is made from a somewhat harder metal material than is cap member 26. For example, the cap member and retaining member can be made from two different grades of aluminum with the retainer being of a harder grade than the cap.

The cap member 26 is installed by simply positioning it over retainer member 24 and then driving it into assembled position with a hammer or other suitable tool. The chamfered top edges 39 on the retainer legs 30, 30 makes it easier to start the cap installation step.

It will be appreciated from the above description that when cap 26 is driven into assembled position on retainer 24, the sharp edges 38 on the retainer will move into tight frictional engagement with the cap wall 42 and will even tend to dig into the material on the cap wall. To insure a tight fit between the retainer 24 and the cap 26 legs 30, 30 of the retainer are dimensioned so that when the cap is driven onto the retainer, the legs 30, 30 will be compressed inwardly so the inherent resiliency of the metal legs 30, 30 will contribute to the frictional engagement between the parts. In other words the diameter line between the edge 38 of one leg 30 and the opposite edge 38 of the other leg 30 is slightly greater than the inside diameter of wall 42 of cap 26. Additional holding friction is provided by the engagement between rounded corners 36 on the retainer and the inside surface of cap wall 42.

With the cap installed as described above the nut 22 and the threaded shank 18 of bolt 16 are securely protected against mechanical damage and corrosion. The cap when securely installed on the retainer becomes in effect a single unit and thus if at any time it becomes necessary to remove the cap 26, this can be readily accomplished by simply unscrewing the cap 26 and retainer 24 as a unit from the bolt. Finally, as previously indicated, a cap and retainer of a given size can be used to protect bolts of a range of smaller sizes.

I claim:

1. A cap assembly for a bolt having a head and a threaded shank with a nut threaded on the threaded shank comprising:

a retainer member of substantially U-shape having a base portion and a pair of legs extending therefrom, each of said legs having a pair of relatively sharp vertical edges thereon, said base portion having a threaded opening therein to facilitate threaded engagement between said retainer member and the threaded shank of said bolt; and a cap member having a top portion and a wall portion integral therewith, said wall portion dimensioned so that when said cap member is fitted over the legs of said retainer member, the sharp edges of said legs will be in tight frictional engagement with the inside surface of said wall portion of said cap member.

2. A cap assembly for a bolt according to calim 1 in which said leg members of said retainer member are made of resilient material and are dimensioned so that when said cap member is assembled on said retainer member, said legs will be compressed inwardly slightly so that the inherent resiliency of said legs will serve to create a tight frictional engagement between the sharp edges on said legs and the inside surface of said cap wall portion.

3. A cap assembly for a bolt according to claim 2 in which said retainer member and said cap member are made of metal material, with the hardness of the retainer metal material being greater than the hardness of said cap metal material.

4. A cap assembly for a bolt according to claim 3 in which the tips of said leg members are chamfered to facilitate the assembly of said cap member on said retainer member.

5. A cap assembly for a bolt according to claim 4 in which the material of said retainer member adjacent the threaded opening therein is upset to produce a threaded opening of increased length.

6. A cap assembly for a bolt having a head and a threaded shank with a nut threaded on the threaded shank comprising:
   a metal retainer member of substantially U-shape having a base portion and a pair of legs extending therefrom, each of said legs having a pair of relatively sharp vertical edges thereon, said base portion having a threaded opening therein to facilitate threaded engagement between said retainer member and the threaded shank of said bolt with said retainer member threaded on the bolt on top of the nut and with the legs of said member extending toward the end of the bolt away from the nut; and
   a metal cap member having a top wall portion and a cylindrical wall portion integral therewith, said cylindrical wall portion and said leg portions dimensioned so that when said cap member is assembled on said retainer member, said legs will be compressed inwardly slightly so that the inherent resiliency of said legs will serve to create a tight frictional engagement between the sharp edges on said legs and the inside surface of said cylindrical wall portion.

7. A cap assembly for a bolt according to claim 6 in which the hardness of the retainer metal material is greater than the hardness of the cap metal material.

8. A cap assembly for a bolt according to claim 7 in which the tips of said leg members are chamfered to facilitate the assembly of said cap member on said retainer member.

9. A cap assembly for a bolt according to claim 8 in which the material of said retainer member adjacent the threaded opening therein is upset to produce a threaded opening of increased length.

* * * * *